United States Patent [19]

Inagaki et al.

[11] Patent Number: 4,937,118
[45] Date of Patent: Jun. 26, 1990

[54] ACTIVE ENERGY RAY-CURABLE COMPOSITION

[75] Inventors: Hajime Inagaki, Iwakuni; Kenji Yamane, Ohtake, both of Japan

[73] Assignee: Mitsui Petrochemical Industries, Inc., Tokyo, Japan

[21] Appl. No.: 379,927

[22] Filed: Jul. 14, 1989

Related U.S. Application Data

[62] Division of Ser. No. 13,035, Feb. 10, 1987, Pat. No. 4,906,675.

[30] Foreign Application Priority Data

Feb. 12, 1986 [JP] Japan .................. 61-26803
Aug. 26, 1986 [JP] Japan .................. 61-198036

[51] Int. Cl.$^5$ .................. B32B 3/02; B32B 27/36; B32B 27/08
[52] U.S. Cl. .................. 428/64; 156/273.5; 428/412; 428/515; 428/516
[58] Field of Search .................. 428/64, 412, 515, 516; 522/182

[56] References Cited

U.S. PATENT DOCUMENTS

| | | | |
|---|---|---|---|
| 4,022,855 | 5/1977 | Hamblen | 522/181 |
| 4,131,729 | 12/1978 | Schmitt | 522/182 |
| 4,308,400 | 12/1981 | Felder | 522/68 |
| 4,347,111 | 8/1982 | Gehlhavs | 522/42 |
| 4,387,182 | 6/1983 | Friedli | 526/282 |
| 4,410,978 | 10/1983 | Broek | 522/181 |
| 4,477,328 | 10/1984 | Broeksema | 522/181 |
| 4,605,719 | 8/1986 | Peelen | 526/282 |
| 4,707,431 | 11/1987 | Umehara | 522/14 |
| 4,720,715 | 1/1988 | Omae et al. | 526/281 |
| 4,868,261 | 9/1989 | Kobayashi et al. | 526/282 |

FOREIGN PATENT DOCUMENTS 0115709 8/1984 European Pat. Off.
0182585 5/1986 European Pat. Off.

Primary Examiner—John C. Bleutge
Assistant Examiner—Arthur H. Koeckert
Attorney, Agent, or Firm—Sherman and Shalloway

[57] ABSTRACT

An active energy ray-curable composition substantially comprising at least one of (meth)acrylates and oligomers thereof represented by the following general formula (I)

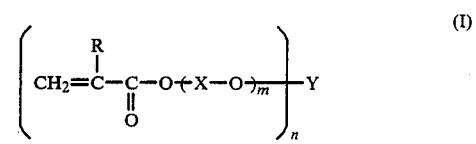

wherein
R represents a hydrogen atom or a methyl group,
X represents an alkylene group in which at least one hydrogen atom may be replaced by a hydroxyl group,
m is 0 or an integer of 1 to 4,
Y represents a hydrocarbon group having a cyclic hydrocarbon moiety therein, and
n is 1 or 2.

The composition is useful as an adhesive, particularly as one in the production of optical discs.

7 Claims, 1 Drawing Sheet

ACTIVE ENERGY RAY-CURABLE COMPOSITION

This is a division of application Ser. No. 07/013,035, filed Feb. 10, 1987, now U.S. Pat. No. 4,906,675.

BACKGROUND OF THE INVENTION

1. Field of the Invention

This invention relates to a composition curable by active energy rays such as ultraviolet light, electron beams or radioactive rays, and particularly to a composition which is suitably used as an adhesive in the production of optical discs.

2. Description of the Prior Art

Photocurable compositions are known. For example, Japanese Laid-Open Patent Publication No. 51035/1973 discloses an ultraviolet light-curable composition comprising (a) at least one oligo ester which is selected from the group consisting of polyester acrylate, polyester methacrylate, epoxy acrylate and epoxy methacrylate having a boiling point at atmospheric pressure of at least 200° C. and has an acryloyl group content of 5 to 100 mole % based on the total amount of the acryloyl and methacryloyl groups, (b) a sensitizer and (c) a thermal polymerization inhibitor. The patent document describes $$CH_2=CHC(-OCH_2CH_2-)_lOOC-\underset{O}{\underset{\|}{}}\text{−C}_6H_4\text{−}COO(-CH_2CH_2O-)_l\underset{O}{\underset{\|}{C}}-CH=CH_2$$

as the component (a). However, when an ultraviolet light-curable composition obtained by using this component is used as an adhesive, it has low tensile shear peel strength and tensile adhesion strength.

U.S. Pat. No. 4,150,170 describes a method of producing an ultraviolet light-curable pressure-sensitive adhesive using an ultraviolet light-curable pressure-sensitive composition comprising an alpha,beta-ethylenically unsaturated vinyl polymerizable monomer and a benzoin $C_1$–$C_{12}$ hydrocarbon alkyl ether. For example, Example 1 of this patent describes a method in which compositions containing butyl acrylate, vinyl acetate and acrylic acid as the above monomer is used.

Japanese Laid-Open Patent Publication No. 142070/1950 discloses a photosensitive adhesive consisting predominantly of a mixture of (A) 100 parts by weight of a polymeric substance containing acryloxy or methacryloxy groups represented by the following formulae (I) to (III) in the molecule $$CH_2=\underset{R}{\overset{|}{C}}-COO- \tag{I}$$

$$CH_2=\underset{R}{\overset{|}{C}}-COO(-CH_2-)_nO- \tag{II}$$

$$CH_2=\underset{R}{\overset{|}{C}}-COO-[(-CH_2-)_mO]_l- \tag{III}$$

wherein
R represents a hydrogen atom or a methyl group,
n represents an integer of 2 or 3,
m is an integer of 1 to 4, and
l is an integer of 1 to 30, said polymeric substance being obtained by the addition-reaction of a polymeric substance having an unsaturated double bond in the molecule with an acrylic compound containing a carboxyl or hydroxyl group in the presence of an alkyl hypohalite or an N-haloamide compound, and (B) at least 50 parts by weight of cyclohexyl methacrylate. This patent document describes an example in which methacrylic-modified polybutadiene is used as the polymeric substance containing an acryloxy or methacryloxy group.

In the prior art, optical discs are produced by bonding a recording layer provided on a substrate and a light-pervious protecting material by means of a photocuring agent. A photocurable composition which can be used in this application is desirably required to have excellent tensile shear peel strength and tensile adhesion strength, effect bonding within a short period of time, and be free from components that adversely affects the recording layer, and further not to impair the optical properties such as transparency of the substrate.

Photocurable compositions known heretofore do not sufficiently satisfy all of these properties.

SUMMARY OF THE INVENTION

It is an object of this invention to provide an adhesive having the aforesaid desirable properties in combination.

Another object of this invention is to provide a novel composition curable by irradiation of active energy rays such as ultraviolet light, electron beams or radioactive rays.

The above objects are achieved in accordance with this invention by an active energy ray-curable composition substantially comprising at least one of (meth)acrylates and oligomers thereof represented by the following general formula (I)

$$\left(CH_2=\underset{R}{\overset{|}{C}}-\underset{O}{\overset{\|}{C}}-O(-X-O-)_{\overline{m}}\right)_n Y \tag{I}$$

wherein
R represents a hydrogen atom or a methyl group,
X represents an alkylene group in which at least one hydrogen atom may be replaced by a hydroxyl group,
m is 0 or an integer of 1 to 4,
Y represents a hydrocarbon group having a cyclic hydrocarbon moiety therein, and
n is 1 or 2.

DETAILED DESCRIPTION OF THE PREFERRED EMBODIMENTS

The present invention provides an active energy ray-curable composition substantially comprising at least one of (meth)acrylates and oligomers thereof represented by the following general formula (I)

wherein
R represents a hydrogen atom or a methyl group,
X represents an alkylene group in which at least one hydrogen atom may be replaced by a hydroxyl group,
m is 0 or an integer of 1 to 4,
Y represents a hydrocarbon group having a cyclic hydrocarbon moiety therein, and
n is 1 or 2.

When m is 0 in formula (I), the active energy ray-curable composition of this invention has the highest affinity for a substrate and therefore excellent adhesion. If m is 5 or more, the composition has poor affinity for a substrate and therefore inferior adhesion. When n is 3 or more in formula (I), the composition has high shrinkage on curing and is excessively hard so that it rather becomes brittle.

In the (meth)acrylate used in the composition of this invention, the organic group constituting the portion derived from the alcohol is a hydrocarbon group which without fail has a cyclic hydrocarbon moiety. The hydrocarbon group may be bonded to the (meth)acryloyloxy group either directly or through an ether linkage represented by $-(X-O)-$. X constituting the ether linkage portion is, in principle, an alkylene group of the formula $-(CH_2)_l-$, but at least one of the hydrogen atoms forming the alkylene group may be replaced by a hydroxyl group. The number of carbon atoms of the alkylene group should preferably be as small as possible. In the present invention, alkylene groups having 1 to 3 carbon atoms are most preferably used. If the number of carbon atoms of the alkylene group is 4 or more, the adhesive property of the resulting composition is reduced.

It is important that the hydrocarbon group constituting Y should contain a cyclic hydrocarbon group such as an alicyclic hydrocarbon group, an aromatic hydrocarbon group, a fused polycyclic hydrocarbon group, or a crosslinked hydrocarbon group. Of these, the alicyclic hydrocarbon group, aromatic hydrocarbon group and crosslinked hydrocarbon group are preferred. Table 1 below shows especially preferred species of such (meth)acrylates.

In the compositions of the present invention, at least one of oligomers obtained by polymerizing the (meth)acrylates with each other may also be used.

TABLE 1

| Chemical formula | Nomenclature |
|---|---|
| CH$_2$=CH-C(=O)-O-cyclohexyl | cyclohexyl acrylate |
| CH$_2$=CH-C(=O)-O-(norbornyl) | norbornyl acrylate |
| CH$_2$=CH-C(=O)-O-(dicyclopentenyl) | dicyclopentenyl acrylate |
| CH$_2$=CH-C(=O)-O-(dicyclopentanyl) | dicyclopentanyl acrylate |
| CH$_2$=CH-C(=O)-O-(isobornyl) | isobornyl acrylate |
| CH$_2$=C(CH$_3$)-C(=O)-O-cyclohexyl | cyclohexyl methacrylate |
| CH$_2$=CH-C(=O)-O-(hexacyclo structure) | hexacyclo[6.6.1.1$^{3,6}$.1$^{10,13}$.0$^{2,7}$.0$^{9,14}$]-heptadecyl-4-acrylate |
| CH$_2$=CH-C(=O)-O-(12-methylhexacyclo structure) | 12-methylhexacyclo[6.6.1.1$^{3,6}$.1$^{10,13}$.0$^{2,7}$.0$^{9,14}$]-heptadecyl-4-acrylate |

TABLE 1-continued

| Chemical formula | Nomenclature |
|---|---|
| | 11-methylhexacyclo[6,6,1,1$^{3,6}$,1$^{10,13}$,0$^{2,7}$,0$^{9,14}$]-heptadecyl-4-acrylate |
| | 12-ethylhexacyclo[6,6,1,1$^{3,6}$,1$^{10,13}$,0$^{2,7}$,0$^{9,14}$]-heptadecyl-4-acrylate |
| | 11-ethylhexacyclo[6,6,1,1$^{3,6}$,1$^{10,13}$,0$^{2,7}$,0$^{9,14}$]-heptadecyl-4-acrylate |
| | octacyclo[8,8,1$^{2,9}$,1$^{4,7}$,1$^{11,18}$,1$^{13,16}$,0$^{3,8}$,0$^{12,17}$]-docosyl-5-acrylate |
| | 15-methyloctacyclo[8,8,1$^{2,9}$,1$^{4,7}$,1$^{11,18}$,1$^{13,16}$,0$^{3,8}$,0$^{12,17}$]docosyl-5-acrylate |
| | 2,7-dimethyltetracyclo[4,4,0,1$^{2,5}$,1$^{7,10}$]dodecyl-3-acrylate |
| | 2,10-dimethyltetracyclo[4,4,0,1$^{2,5}$,1$^{7,10}$]dodecyl-3-acrylate |

TABLE 1-continued

| Chemical formula | Nomenclature |
|---|---|
| (structure) | 11,12-dimethyltetracyclo[4.4.0,1$^{2,5}$,1$^{7,10}$]dodecyl-3-acrylate |
| (structure) | tetracyclo[4.4.0,1$^{2,5}$,1$^{7,10}$]dodecyl-3-acrylate |
| (structure) | 9-substituted tetracyclo[4.4.0,1$^{2,5}$,1$^{7,10}$]-dodecyl-3-acrylate<br>R = methyl, ethyl, propyl, isobutyl, hexyl, cyclohexyl, stearyl, bromo, fluoro |
| (structure) | 8-substituted tetracyclo[4.4.0,1$^{2,5}$,1$^{7,10}$]-dodecyl-3-acrylate<br>R = methyl, ethyl, propyl, isobutyl, hexyl, cyclohexyl, stearyl, bromo, fluoro |
| (structure) | 8,9-disubstituted tetracyclo[4.4.0,1$^{2,5}$,1$^{7,10}$]-dodecyl-3-acrylate<br>R = methyl, ethyl, propyl, isobutyl, hexyl, cyclohexyl, stearyl, bromo, fluoro |
| (structure) | hexacyclo[6,6,1,1$^{3,6}$,1$^{10,13}$,0$^{2,7}$,0$^{9,14}$]heptadecyl-4-methacrylate |
| (structure) | 12-methylhexacyclo[6,6,1,1$^{3,6}$,1$^{10,13}$,0$^{2,7}$,0$^{9,14}$]-heptadecyl-4-methacrylate |

TABLE 1-continued

| Chemical formula | Nomenclature |
|---|---|
| | 11-methylhexacyclo[6,6,1,1$^{3,6}$,1$^{10,13}$,0$^{2,7}$,0$^{9,14}$]-heptadecyl-4-methacrylate |
| | 12-ethylhexacyclo[6,6,1,1$^{3,6}$,1$^{10,13}$,0$^{2,7}$,0$^{9,14}$]-heptadecyl-4-methacrylate |
| | 11-ethylhexacyclo[6,6,1,1$^{3,6}$,1$^{10,13}$,0$^{2,7}$,0$^{9,14}$]-heptadecyl-4-methacrylate |
| | octacyclo[8,8,1$^{2,9}$,1$^{4,7}$,1$^{11,18}$,1$^{13,16}$,0,0$^{3,8}$,0$^{12,17}$]-docosyl-5-methacrylate |
| | 15-methyloctacyclo[8,8,1$^{2,9}$,1$^{4,7}$,1$^{11,18}$,1$^{13,16}$,0,0$^{3,8}$,0$^{12,17}$]docosyl-5-methacrylate |
| | 2,7-dimethyltetracyclo[4,4,0,1$^{2,5}$,1$^{7,10}$]dodecyl-3-methacrylate |
| | 2,10-dimethyltetracyclo[4,4,0,1$^{2,5}$,1$^{7,10}$]dodecyl-3-methacrylate |

TABLE 1-continued

| Chemical formula | Nomenclature |
|---|---|
| [structure: dimethyl tetracyclic methacrylate] | 11,12-dimethyltetracyclo[4.4.0.1$^{2,5}$.1$^{7,10}$]dodecyl-3-methacrylate |
| [structure: tetracyclic methacrylate] | tetracyclo[4.4.0.1$^{2,5}$.1$^{7,10}$]dodecyl-3-methacrylate |
| [structure: R-substituted tetracyclic methacrylate] | 9-substituted tetracyclo[4.4.0.1$^{2,5}$.1$^{7,10}$]-dodecyl-3-methacrylate<br>R = methyl, ethyl, propyl, isobutyl, hexyl, cyclohexyl, stearyl, bromo, fluoro |
| [structure: R-substituted tetracyclic methacrylate] | 8-substituted tetracyclo[4.4.0.1$^{2,5}$.1$^{7,10}$]-dodecyl-3-methacrylate<br>R = methyl, ethyl, propyl, isobutyl, hexyl, cyclohexyl, stearyl, bromo, fluoro |
| [structure: R,R'-disubstituted tetracyclic methacrylate] | 8,9-disubstituted tetracyclo[4.4.0.1$^{2,5}$.1$^{7,10}$]-dodecyl-3-methacrylate<br>R = methyl, ethyl, propyl, isobutyl, hexyl, cyclohexyl, stearyl, bromo, fluoro |
| [structure: dicyclopentenyloxyethyl acrylate] | dicyclopentenyloxyethyl acrylate |
| [structure: bisoxyethyl bisphenol A diacrylate] | bisoxyethyl bisphenol A diacrylate |
| [structure: γ-phenoxyl-β-hydroxypropyl acrylate] | γ-phenoxyl-β-hydroxypropyl acrylate |

The use of a photopolymerization initiator is not essential in this invention. However, when an active energy ray of a relatively low energy, for example ultraviolet light, is used, it is desirable to incorporate it in the composition of this invention. The photopolymerization initiator may be any of various known photopolymerization initiators such as those of the decomposition type which upon irradiation of UV or the like decompose and generate radicals and those of the hydrogen extraction type which generate radicals by hydrogen extraction upon irradiation. Specific examples of the photopolymerization initiator include benzoin, benzoin ethers such as benzoin methyl ether, benzoin ethyl ether, benzoin isopropyl ether and benzoin butyl ether, benzophenone compounds such as benzophenone, p-chlorobenzophenone and p-methoxybenzophenone, benzil compounds such as benzil and benzyl dimethyl ketal, and hydroxyalkylphenyl ketone compounds such as 1-(4-isopropylphenyl)-2-hydroxy-2-methyl-1-propanone, 1-phenyl-2-hydroxy-2-methyl-1-propanone and 1-(4-tert-butylphenyl)-2-hydroxy-2-methyl-1-propanone.

The composition of this invention substantially contains the above (meth)acrylate and its oligomer as a main component, and preferably further contains the photopolymerization initiator. Hence, basically, it is of the solventless type.

The (metha)acrylate oligomer used in the composition of this invention has an average degree of polymerization of 2 to 100, preferably 2 to 50, and more preferably 2 to 35.

The amount of the (meth)acrylate oligomer used in this invention is 1 to 100% by weight, preferably 5 to 95% by weight, more preferably 10 to 90% by weight, based on the total weight of the (meth)acrylate oligomer and the (meth)acrylate monomer.

The viscosity of the composition of this invention, which depends upon the average molecular weight and the content in % by weight of the (meth)acrylate oligomer, is, for example, 10 to 50,000 cps, preferably 100 to 40,000 cps, more preferably 1,000 to 30,000 cps.

The composition may contain components usually incorporated in solventless adhesives, for example reactive diluents, sensitizers, thickeners, antisagging agents, storage stabilizer and plasticizers.

The amount of the photopolymerization initiator which may be used in the composition of this invention is 0.01 to 10 parts by weight, preferably 0.05 to 7 parts by weight, more preferably 0.1 to 5 parts by weight, per 100 parts by weight of the (meth)acrylate and its oligomer.

The composition of this invention is prepared, for example, by the following procedure. At least one monomer of formula (I) and the photopolymerization initiator are fed into a four-necked flask equipped with a water-cooled jacket and a stirrer. While the contents were cooled with water with stirring, ultraviolet light was irradiated from a water-cooled high-pressure mercury lamp with an output of 100W to effect photopolymerization in an air atmosphere. The pressure of the inside of the flask was reduced with stirring, and the reaction mixture in purified form is obtained.

The composition of this invention is cured as follows:

The resulting reaction mixture is used to bond adhesion test pieces. Light is irradiated onto the bonded test pieces from a water-cooled high pressure mercury lamp with an output of 3 KW to cure the reaction mixture.

The composition of the present invention is useful, for example, in coating and bonding various substrates, particularly transparent substrate materials, above all bonding of optical materials, for example the bonding of lenses or optical discs. When the substrate used is one which contains a component which is likely to react with a chemical substance and undergo degeneration, for example a recording layer of an optical disc, it is preferred to use a composition in accordance with this invention which substantially comprises the above (meth)acrylate oligomer from which monomer components have been removed, and as required the photopolymerization initiator.

The composition of this invention exhibit particularly firm adhesiveness to such substrates as those made of polycarbonate polymers, (meth)acrylate polymers, ethylene/cyclic olefin copolymer or olefin copolymers containing 4-methyl-1-pentene as a main component. One examples of the ethylene/cyclic olefin copolymers is a copolymer of ethylene with a monomer component of the following formula (1) which monomer assumes the structure of the following formula (2) in the copolymer. In the formulae, $R^1$ to $R^{12}$ are identical or different and each represents hydrogen, alkyl or halogen, $R^9$ or $R^{10}$ and $R^{11}$ or $R^{12}$ may form a ring together, n is 0 or a positive number of at least 1, when $R^5$ to $R^8$ recur a plurality of times, they may be identical or different.

According to this invention, there can be provided a novel active energy ray-curable composition which curses within a short period of time by irradiation of ultraviolet light, electron beams, radioactive rays, etc., has high adhesion strength, does not impair the optical properties of substrates, and is non-polluting because it is of the solventless type.

The following examples illustrate the present invention more specifically.

The adhesion strengths of the compositions in these examples were evaluated by the following methods.

(i) Tensile shear peel strength

Figure 1:
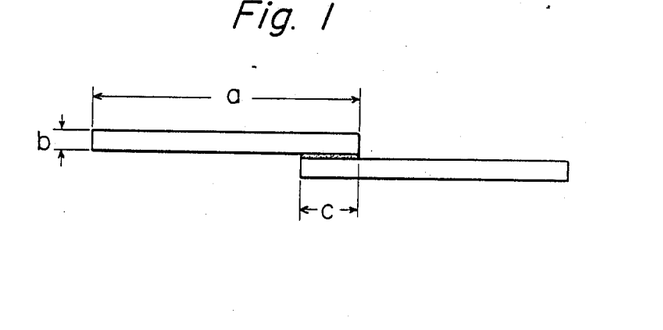
FIGS. 1 and 2 are views showing the states of test pieces used for measuring adhesion strengths in this invention.

The surface of a test plate, 20×120×2 mm, cut out from an injection-molded plate of a resin was lightly wiped with gauze impregnated with isopropanol, and then the composition of the invention was coated on it so that the area of adhesion became 4 cm². Another test plate was superimposed on it, and the assembly was held by quartz glass and fixed. Then active energy ray was irradiated to cure the adhesive composition. The cross-sectional surface of the test piece is shown in FIG. 1. In FIG. 1, a=120 mm, b=2 mm, and c=20 mm.

The resulting test piece assembly was pulled at a rate of 50 mm/min. using a tensile tester (Model 1123 made by Instron Co.), and the tensile force was measured. The tensile shear peel strength was calculated by dividing the tensile force by the area of adhesion.

(ii) Tensile adhesion strength

Figure 2:
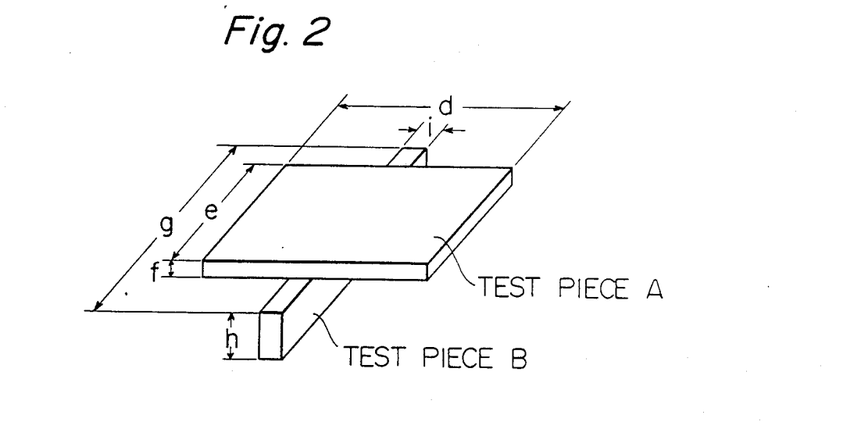

A test piece A (30×12.7×3 mm) and a test piece B (25×12×6.3 mm) were prepared from a resin by injection molding. The surfaces of the test pieces were lightly wiped with gauze impregnated with isopropanol. The composition of the invention was then coated on the test piece A, and spread uniformly on the adhesion surface by using the test pieces B (area of adhesion=0.8 cm$^2$). The test pieces were fixed by holding them by quartz glass so that the test piece A was situated atop. By irradiating active energy ray onto the assembly, the test pieces were cured. The appearance of the test piece assembly after bonding is shown in FIG. 2. In FIG. 2, d=30 mm, e=12.7 mm, f=3 mm, g=25 mm, h=12 mm, and i=6.3 mm.

The test piece assembly was pulled at a speed of 50 mm/min. by using a tensile tester (Model 1123 made by Instron Co.), and the tensile force was measured. The tensile adhesion strength was calculated by dividing this tensile force by the area of adhesion.

EXAMPLE 1

A 1-liter four-necked flask equipped with a water-cooled jacket and a stirrer was charged with 500 g of tetracyclo[4,4,0,1$^{2,5}$,1$^{7,10}$]-dodecyl-3-acrylate and 1.5 g of 1-(4-isopropylphenyl)-2-hydroxy-2-methyl-1-propanone as a photopolymerization initiator. While the contents were cooled with water with stirring, ultraviolet light was irradiated for 10 minutes onto the flask by a 100 W high-pressure mercury lamp placed at a distance of 10 cm from the flask to perform photopolymerization in an air atmosphere. Then, the flask was evacuated to 1 torr by using a vacuum pump with stirring, and the reaction mixture was purified for 3 hours. The resulting reaction mixture was transparent viscous liquid having a viscosity of 1250 cps.

Gel permeation chromatography showed that the reaction mixture consisted of about 70% by weight of the unreacted monomer and abut 30% by weight of oligomers (dimer to eicosamer).

Adhesion test pieces of TPX® (brand TR-18, a product of Mitsui Petrochemical Industries, Ltd.) were bonded by using the resulting reaction mixture. By irradiating light for 30 minutes from a 3 KW high-pressure mercury lamp at a distance of 15 cm, the reaction mixture applied to the test pieces was cured. The adhesion strengths of the resulting bonded test sample are shown in Table 2.

EXAMPLE 2

Adhesion test pieces of polycarbonate were bonded by the same method as in Example 1 using the reaction mixture obtained in Example 1. The results are shown in Table 2.

EXAMPLE 3

Adhesion test pieces of poly(methyl methacrylate) were bonded by the same method as in Example 1 using the reaction mixture obtained in Example 1. the results are shown in Table 2.

EXAMPLE 4

Adhesion test pieces of ethylene/tetracyclododecene copolymer (ethylene 57 mole %; [$\eta$]0.44 dl/g) were bonded by the same method as in Example 1 using the reaction mixture obtained in Example 1. The results are shown in Table 2. The [$\eta$] was measured at 135° C. using decalin as a solvent.

EXAMPLE 5

The same reaction as in Example 1 was carried out except that 500 g of cyclohexyl acrylate was used as the monomer, 1 g of 1-phenyl-2-hydroxy-2-methyl-1-propanone was used as the photopolymerization initiator, and the time of irradiating ultraviolet light was changed to 15 minutes. The reaction mixture obtained was a transparent viscous liquid having a viscosity of 2610 cps.

Gel permeation chromatography showed that the reaction mixture consisted of about 40% by weight of the unreacted monomer and about 60% by weight of oligomers (dimer to hexacosamer).

Adhesion test pieces of ethylene/tetracyclododecene shown in Example 4 were bonded by using this reaction mixture by the same method as in Example 1. The results are shown in Table 2.

EXAMPLE 6

Example 5 was repeated except that norbornyl acrylate was used as the monomer. The results are shown in Table 2. The resulting reaction mixture was a transparent viscous liquid having a viscosity of 1860 cps.

EXAMPLES 7-9

Example 5 was repeated except that each of the monomers indicated in Table 3 was used. The results are shown in Table 2. The viscosity and appearance of the reaction mixture obtained in each of the examples shown in Table 3.

EXAMPLES 10-11

Example 5 was repeated except that each of the adherends shown in Table 2 was used. The results of the test are shown in Table 2.

TABLE 2

| Example | 1 | 2 | 3 | 4 | 5 |
|---|---|---|---|---|---|
| Monomer | tetracyclo[4,4,0,1$^{2,5}$-1$^{7,10}$]-dodecyl-3-acrylate | same as left | same as left | same as left | cyclohexyl acrylate |
| Photopolymerization initiator | 1-(4-isopropylphenyl)-2-hydroxy-2-methyl-1-propanone | same as left | same as left | same as left | 1-phenyl-2-hydroxy-2-methyl-1-propanone |
| Adherend | TPX (RT-18) | polycarbonate | polymethyl methacrylate | ethylene/tetracyclododecene copolymer | same as left |

TABLE 2-continued

| | | | | | |
|---|---|---|---|---|---|
| Tensile shear peel strength (kg/cm$^2$) | 9.7 | 6.9 | 7.8 | 11.2 | 12.3 |
| Tensile adhesion strength (kg/cm$^2$) | 10.4 | 7.3 | 8.5 | 12.1 | 13.5 |

| Example | 6 | 7 | 8 | 9 | 10 | 11 |
|---|---|---|---|---|---|---|
| Monomer | norbornyl acrylate | dicyclopentyl acrylate | dicyclopentenyl acrylate | isoboronyl acrylate | cyclohexyl acrylate | same as left |
| Photopolymerization initiator | 1-phenyl-2-hydroxy-2-methyl-1-propanone | same as left | same as left | same as left | same as left | same as left |
| Adherend | ethylene/tetracyclododecene copolymer | same as left | same as left | same as left | TPX (RT-18)/PR-PET | TPX (RT-18)/Polyether sulfone |
| Tensile shear peel strength (kg/cm$^2$) | 8.4 | 6.7 | 7.8 | 9.4 | 6.2 | 5.0 |
| Tensile adhesion strength (kg/cm$^2$) | 7.8 | 7.9 | 6.9 | 8.5 | 5.3 | 4.7 |

TABLE 3

| Example | 7 | 8 | 9 |
|---|---|---|---|
| Monomer | dicyclopentyl acrylate | dicyclopentenyl acrylate | isoboronyl acrylate |
| Viscosity (cps) | 2960 | 2780 | 2640 |
| Appearance | transparent viscous liquid | same as left | same as left |

EXAMPLES 12–14

Example 5 was repeated except that each of the acrylates indicated in Table 4 was used as the monomer. The results are shown in Table 4. The reaction mixtures obtained in these examples were transparent viscous liquids whose viscosities are shown in Table 4.

EXAMPLE 15

Example 5 was repeated except that 250 g of tetracyclo[4,4,0,1$^{2,5}$,1$^{7,10}$]dodecyl-3-acrylate and 250 g of dicyclopentenyloxyethyl acrylate were used as the monomer. The results are shown in Table 4.

The resulting reaction mixture was a transparent viscous liquid whose viscosity is shown in Table 4.

EXAMPLE 16

A reaction mixture was prepared as in Example 1 except that 400 g of tetracyclo[4,4,0,1$^{2,5}$,1$^{7,10}$]dodecyl-3-acrylate and 100 g of bisoxyethyl bisphenol A diacrylate were used as the monomer and the ultraviolet light was irradiated for 30 minutes. The resulting reaction mixture had a viscosity of 26,500 cps.

Using the reaction mixture, the same adhesion test as in Example 5 was carried out. The results are shown in Table 4.

TABLE 4

| Example | 12 | 13 | 14 | 15 | 16 |
|---|---|---|---|---|---|
| Monomer | dicyclopentenyloxyethylene acrylate | bisoxyethyl bisphenol A diacrylate | gamma-phenoxy-beta-hydroxypropyl acrylate | tetracyclo[4,4,0,1$^{2,5}$,1$^{7,10}$]-dodecyl-3-acrylate/dicyclopentenyloxyethyl acrylate (1:1 by weight) | tetracyclo[4,4,0,1$^{2,5}$,1$^{7,10}$]-dodecyl-3-acrylate/bisoxyethyl bisphenol A diacrylate (4:1 by weight) |
| Photopolymerization initiator | 1-phenyl-2-hydroxy-2-methyl-1-propanone | same as left | same as left | same as left | 1-(4-isopropylphenyl)-2-hydroxy-2-methyl-1-propanone |
| Adherend | ethylene/tetracyclododecene copolymer | same as left | same as left | same as left | same as left |
| Tensile shear peel strength (kg/cm$^2$) | 10 | 8.5 | 10.5 | 11 | 11.5 |
| Tensile ashesion strength (kg/cm$^2$) | 11 | 10 | 12 | 12 | 10.5 |
| Viscosity (cps) | 2050 | 2870 | 2300 | 2780 | 26500 |

COMPARATIVE EXAMPLES 1–17

Example 5 was repeated except that each of the acrylates indicated in Table 5 was used as the monomer. The results of the adhesion tests and the viscosities of the resulting reaction mixtures are shown in Table 5.

TABLE 5

| | Comparative Example 1 | Comparative Example 2 | Comparative Example 3 |
|---|---|---|---|
| Monomer | (structure with COOH) | (structure with OH) | (structure with NCO/NH) |
| Photopolymerization initiator | 1-phenyl-2-hydroxy-2-methyl-1-propanone | same as left | same as left |
| Adherend | ethylene/tetracyclododecene copolymer | same as left | same as left |
| Tensile shear peel strength (kg/cm²) | 1 | 0 | 1 |
| Tensile adhesion strength (kg/cm²) | 2 | 0 | 2 |
| Viscosity (cps) | 3200 | 2800 | 2510 |

| | Comparative Example 4 | Comparative Example 5 | Comparative Example 6 |
|---|---|---|---|
| Monomer | (structure) | (structure) | (structure) |
| Photopolymerization initiator | 1-phenyl-2-hydroxy-2-methyl-1-propanone | same as left | same as left |
| Adherend | ethylene/tetracyclododecene copolymer | same as left | same as left |
| Tensile shear peel strength (kg/cm²) | 0 | 0 | 0 |
| Tensile adhesion strength (kg/cm²) | 0 | 0 | 0 |
| Viscosity (cps) | 2870 | 2950 | 2070 |

| | Comparative Example 7 | Comparative Example 8 | Comparative Example 9 |
|---|---|---|---|
| Monomer | (structure) | (structure) | (structure) |

TABLE 5-continued

| | Comparative Example 10 | Comparative Example 11 | Comparative Example 12 |
|---|---|---|---|
| Photopolymerization initiator | 1-phenyl-2-hydroxy-2-methyl-1-propanone | same as left | same as left |
| Adherend | ethylene/tetracyclo-dodecene copolymer | same as left | same as left |
| Tensile shear peel strength (kg/cm$^2$) | 0 | 0 | 0 |
| Tensile adhesion strength (kg/cm$^2$) | 0 | 0 | 0 |
| Viscosity (cps) | 1910 | 3250 | 3510 |

| | Comparative Example 13 | Comparative Example 14 | Comparative Example 15 |
|---|---|---|---|
| Monomer | (structure) | (structure) | (structure) |
| Photopolymerization initiator | 1-phenyl-2-hydroxy-2-methyl-1-propanone | 1-phenyl-2-hydroxy-2-methyl-1-propanone | 1-phenyl-2-hydroxy-2-methyl-1-propanone |
| Adherend | ethylene/tetracyclo-dodecene copolymer | same as left | same as left |
| Tensile shear peel strength (kg/cm$^2$) | 0 | 0 | |
| Tensile adhesion strength (kg/cm$^2$) | 0 | 0 | 0 |
| Viscosity (cps) | 1020 | 2100 | 3180 |
| Tensile | 0 | | |

TABLE 5-continued

| | Comparative Example 16 | Comparative Example 17 |
|---|---|---|
| shear peel strength (kg/cm²) | | 0 |
| Tensile adhesion strength (kg/cm²) | 0 | 0 |
| Viscosity (cps) | 2970 | 2500 |

| | Comparative Example 16 | Comparative Example 17 |
|---|---|---|
| Monomer | structure with C-O-C(=O), OH group, vinyl | pentaerythritol-based structure: [-O-CH₂CH₂O-, -O-CH₂C(CH₂OCH₂CH₂O-)(CH₂OCH₂CH₂O-)-OCH₂CH₂O-][-(C(=O))-(O)ₘ-C(=O)-V]ₐ [-(C(=O)-V)]ᵦ, m=1, a=6, b=0 |
| Photopolymerization initiator | 1-phenyl-2-hydroxy-2-methyl-1-propanone | same as left |
| Adherend | ethylene/tetracyclododecene copolymer | same as left |
| Tensile shear peel strength (kg/cm²) | 0 | 0 |
| Tensile adhesion strength (kg/cm²) | 0 | 0 |
| Viscosity (cps) | 2090 | 3520 |

What is claimed is:

1. A light transparent laminated article comprising first and second light transparent layers bonded to each other via an adhesive composition comprising an active energy ray cured adhesive composition obtained by curing tetracyclo[4,4,0,1$^{2,5}$,1$^{7,10}$] dodecyl-3-acrylate, an oligomer thereof, or a mixture thereof.

2. The light transparent laminated article of claim 1 wherein the cured adhesive composition comprises a cured mixture of tetracyclo[4,4,0,1$^{2,5}$,1$^{7,10}$] dodecyl-3-acrylate, and an oligomer thereof.

3. The laminated article of claim 2 wherein said oligomer comprises from 5 to 95% by weight of said mixture.

4. The laminated article of claim 1 wherein said oligomer has an average degree of polymerization of from 2 to 50.

5. The laminated article of claim 1 wherein said adhesive composition further comprises dicyclopentenyloxyethyl acrylate or bisoxyethyl bisphenol A diacrylate.

6. The light transparent laminated article of claim 1 wherein at least one of the first and second light transparent layers is comprised of a polycarbonate polymer, a (meth)acrylate polymer, an ethylene/cyclic olefin copolymer or an olefin copolymer containing 4-methyl-1-pentene as a main component.

7. An optical disc comprising the light transparent laminated article of claim 1, one of said light transparent layers comprising a recording layer and the other of said light transparent layers comprising a protecting material for protecting said recording layer.

* * * * *